`US010414327B2`

(12) United States Patent
Brede et al.

(10) Patent No.: US 10,414,327 B2
(45) Date of Patent: Sep. 17, 2019

(54) PROCEDURE FOR THE OPERATION OF AT LEAST ONE HEADLAMP OF A VEHICLE

(71) Applicant: Hella GmbH & Co. KGaA, Lippstadt (DE)

(72) Inventors: Norbert Brede, Lippetal (DE); Ralf Edelmeier, Herzebrock-Clarholz (DE); Henrik Hesse, Paderborn (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/778,076

(22) PCT Filed: Nov. 14, 2016

(86) PCT No.: PCT/EP2016/077548
§ 371 (c)(1),
(2) Date: May 22, 2018

(87) PCT Pub. No.: WO2017/089155
PCT Pub. Date: Jun. 1, 2017

(65) Prior Publication Data
US 2018/0334086 A1 Nov. 22, 2018

(30) Foreign Application Priority Data
Nov. 23, 2015 (DE) .......................... 10 2015 120 204

(51) Int. Cl.
*B60Q 1/04* (2006.01)
*B60Q 1/06* (2006.01)
*B60Q 1/14* (2006.01)
*F21S 41/141* (2018.01)
*F21Y 105/16* (2016.01)
*F21Y 115/10* (2016.01)

(52) U.S. Cl.
CPC ......... *B60Q 1/1423* (2013.01); *B60Q 1/1415* (2013.01); *F21S 41/141* (2018.01); *F21Y 2105/16* (2016.08); *F21Y 2115/10* (2016.08)

(58) Field of Classification Search
None
See application file for complete search history.

(56) References Cited

U.S. PATENT DOCUMENTS

| 7,501,767 B2 * | 3/2009 | Hayami | B60Q 1/10 307/10.1 |
| 2017/0192224 A1 * | 7/2017 | Logiudice | H05B 33/0854 |

FOREIGN PATENT DOCUMENTS

| DE | 102007040042 A1 | 2/2009 | |
| DE | 102008062640 A1 | 7/2009 | |
| DE | 102013016904 A1 * | 7/2014 | ......... B60Q 1/1423 |
| DE | 102013016904 A1 | 7/2014 | |
| EP | 2636946 A2 | 9/2013 | |

* cited by examiner

Primary Examiner — Dedei K Hammond
(74) Attorney, Agent, or Firm — Husch Blackwell LLP

(57) ABSTRACT

A procedure is provided for the operation of at least one headlamp of a vehicle and for the headlamp-specific adaptation of at least one non-headlamp-specific light pattern information from an interface device of the vehicle.

8 Claims, 2 Drawing Sheets

PROCEDURE FOR THE OPERATION OF AT LEAST ONE HEADLAMP OF A VEHICLE

CROSS REFERENCE

This application claims priority to PCT Application No. PCT/EP2016/077548, filed Nov. 15, 2016, which itself claims priority to German Patent Application 10 2015 120204.2, filed Nov. 23, 2015, the entirety of both of which are hereby incorporated by reference.

FIELD OF THE INVENTION

The present invention relates to a procedure for the operation of at least one headlamp of a vehicle. Furthermore, the invention relates to a device for a vehicle with at least one processing device as well as at least one pixel, and to an interface device for a vehicle.

BACKGROUND

From the prior art, headlamps for vehicles are known, which have several pixels for light radiation to achieve a variable light distribution on the headlamp. To this end, the pixels of the headlamps can each be controlled individually, depending on specific parameters, such as the brightness of the pixel. Hereby further functions like bend lighting or a dazzle-free high beam can be realized in the headlamp in addition to the low beam and the high beam. Light algorithms are used for the execution of the control of the pixels and for the determination of the control information required for this purpose, e.g. the brightness values per pixel. The light distribution and the control information for every individual pixel are calculated. This requires the use of headlamp-specific parameters, such as the optical properties and/or information on the individual pixels of the headlamp, however. Headlamp-specific information comprising the control information for the individual pixels need to be established by the algorithms.

Various approaches to solving the problem are known from the prior art. The headlamp-specific information is for example determined by a central electronic unit of the vehicle by means of light algorithms, and then the brightness values per pixel of the headlamp are for example transmitted from this central electronic unit to the two headlamps of the vehicle. The related communication effort is rather great, however, and the central algorithms need to be adapted to the headlamps used.

Furthermore it is possible that the calculation of the algorithms is executed exclusively and directly by a control unit of the headlamp. A central development of the light algorithms and a central calculation, e.g. by the electronic unit of the vehicle is herein not possible, however.

The disadvantage of the known solutions lies in the great maintenance effort they require as well as in high manufacturing costs. Furthermore, a flexible adaptation of the algorithms is not easily possible, as the headlamp-specific parameters must always be considered. This also limits the reliability of the known solutions.

SUMMARY OF THE INVENTION

It is, therefore, the task of the present invention to correct the disadvantages described above at least partially. In particular, it is the task of the present invention to propose a procedure for the operation of at least one headlamp of a vehicle allowing simpler maintenance and a more flexible adaptation of the light algorithms. Furthermore, reliability is to be increased and the manufacturing costs are to be reduced.

Herein, characteristics and details apply which are described in connection with the procedure according to the invention, also in connection with the device according to the invention, and the interface device according to the invention and vice versa respectively, of course, so that with regard to the disclosure, mutual reference can always be made to the individual aspects of the invention.

The task is in particular solved by a procedure for the operation of at least one, and in particular two headlamps of a vehicle, in particular of a motor vehicle and/or a passenger car and/or a heavy goods vehicle, and for the headlamp-specific adaptation of at least one non-headlamp-specific light pattern information of an interface device (and/or a central control device) of the vehicle. The term "central" refers particularly to the fact that the interface device and/or the control device are provided in a central location of the vehicle and/or control/s several devices according to the invention. The central control device (and/or the interface device) of the vehicle is herein, for example, part of a central vehicle electronic unit driving one or several headlamps of the vehicle. Furthermore it can be planned, that the interface device and/or the central control device is/are also connected electrically in a direct or an indirect manner with electronic components of the vehicle, such as one or several cameras and/or with a radar sensor and/or with devices for the measuring of the speed and/or the determination of the steering direction. The interface device comprises for example electronic components, in particular on a printed circuit board, in particular at least one processing unit, such as a microprocessor, and is preferably electrically connected with the control unit (for example via a CAN-bus) and/or integrated in it. The light pattern information is in particular information on a headlamp-independent, desired light distribution pattern. Furthermore the procedure according to the invention preferably comprises at least one of the following steps, which are preferably executed in chronological order:

a) Reception of the light pattern information by a processing device of the headlamp, comprising in particular a processing unit such as an electronic component and/or a microprocessor and/or a micro-controller and/or an application-specific integrated circuit (ASIC) and/or a field-programmable gate array (FPGA) and/or a digital signal processor, b) Conversion of the light pattern information into headlamp-specific information via the processing device by means of at least one headlamp-specific parameter, c) Driving of at least one pixel of the headlamp depending on the headlamp-specific information, in particular by the processing unit.

By this, the advantage is achieved that a separation of the light algorithm from optical properties of the headlamps is possible. The light algorithms can therefore be developed in a headlamp-independent manner and can therefore be used for different variants of headlamps without substantial modifications. This simplifies the algorithms and reduces the manufacturing costs. The calculation of the light pattern information per headlamp by means of the light algorithms is preferably executed centrally in the vehicle, i.e. in particular for at least two headlamps of the vehicle, by the interface device and/or the central control device of the vehicle. In particular, no headlamp-specific information, such as e.g. brightness values for individual pixels, is transmitted from the interface device and/or the central control device to the headlamps. Instead, preferably the light pattern information, such as e.g. light patterns of a desired resulting light distribution pattern of the headlamp only, are transmitted by the interface device and/or the central control device of the vehicle to the headlamps, in particular to the processing device of the headlamp and/or to the processing devices of both or all headlamps of the vehicle. The conversion into headlamp-specific information, such as e.g. into the brightness values of the individual pixels of the headlamp, taking into account the optical properties of the headlamp, is preferably executed in the processing device. Herein, the processing device is for example a control unit in the headlamp, in particular a headlamp-internal electronic unit. The processing device comprises for example a headlamp-specific electronic unit and/or electronic components for the execution of headlamp-specific algorithms for the conversion of the light pattern information into headlamp-specific information. "Headlamp-specific" means in particular that information on technical characteristics and/or optical properties of the headlamp is taken into account.

The non-headlamp-specific light pattern information comprises in particular digital data and is preferably generated by the interface device and/or provided for transmission (to the processing device of the headlamp). The light pattern information comprises for example a light distribution in space, for example on a 10 m wall. The light pattern information herein comprises particularly information which is non-headlamp-specific, i.e. independent of (optical) properties of specific headlamp types. Such information comprises for example physically measureable values and/or (pixel-independent) brightness values, i.e. the illuminance and/or the color of the desired light distribution pattern.

The pixel is in particular the smallest controllable optical unit of the headlamp to achieve a change in light distribution on the headlamp. Herein, the pixel can for example be executed as an LED (light emitting diode) and/or as a micromirror and/or as a display, i.e. as a pixel of the display, and/or as a shutter and/or as a blind and/or as an optical device for the modification and/or change and/or absorption of individual light beams. This has the advantage, that the light distribution pattern is variably adjustable and that various headlamp functions can be realized.

It can, for example, be planned, that the headlamp comprises a pixel arrangement with several pixels, wherein the pixels are controlled individually, and in particular independent of each other, by the processing unit by means of at least one control information to determine the light distribution pattern of the headlamp and/or to vary it. The pixel arrangement is preferably a LED matrix, wherein the individual pixels are embodied as LEDs. The headlamp can comprise for example a minimum of 10 and/or a minimum of 20 and/or a minimum of 50 and/or a minimum of 100 and/or at least 200 pixels.

It is also conceivable, that the headlamp comprises at least 2 and/or at least 3 and/or at least 10 pixel arrangements. The individual pixels and/or pixel arrangements are preferably controllable in an adaptive manner. By this means, advanced headlamp functions can be realized in advantageous manner.

Furthermore, it is optionally planned, that the headlamp-specific information contains the control information for each individual pixel of the pixel arrangement. The control information comprises for example a brightness value (information) for the pixels. Furthermore, the control information can for example also contain operating information for the pixel, which depends for example on the desired brightness value. This is for example a duty cycle for pulse width modulation and/or an aperture angle and/or an aperture ratio for a shutter. The control information is herein for example depending on headlamp-specific parameters. The headlamp-specific parameters are for example stored in a non-volatile memory unit in the headlamp. This ensures, that only the processing device of the headlamp has to consider the headlamp-specific parameters, and that therefore the (non-headlamp-specific) light algorithms for the interface device and/or the central control device can be developed centrally and with identical information for various series of the headlamps.

Furthermore, it can be advantageous within the framework of the invention, if the headlamp-specific parameter comprises at least one of the following information:
   optical properties of the headlamp,
   number and/or arrangement of the pixels of the headlamp,
   brightness levels of the individual pixels,
   properties of at least one reflector of the headlamp,
   properties of at least one light source of the headlamp,
   information on a transmission function of the headlamp,
   properties of further optical components of the headlamp.

This has the advantage, that the (central) interface device and/or the central control device do not have to consider the optics of the various headlamp versions for which the light algorithms can be used.

In a further embodiment it can be planned, that the transformation according to step b) and or the control according to step c) is executed by the processing device, in particular by a headlamp-specific algorithm, and/or a model-based calculation and/or simulation of the light radiation of the headlamp, in particular so that the headlamp-specific information comprises a control information being required for the creation of an optical light distribution pattern according the light pattern information. The light pattern information corresponds, therefore, preferably to a desired resulting light distribution pattern, e.g. similar to a situation of the light distribution pattern of the headlamp on a wall at a distance of 10 m. This distant, i.e. projected light distribution pattern corresponds in particular to the optical light pattern, i.e. a headlamp-independent (non-headlamp-specific) required information. This required information can be transformed into information for the control of the pixels of the headlamp, preferably by means of the processing device of the headlamp. By this means, a defined interface is created between the headlamp and the vehicle electric system. This results in the advantage that it is not necessary to adapt the (central) interface device and/or the central control device of the vehicle to a specific headlamp type, but merely to a non-headlamp-specific interface, which means that it is suitable for controlling various headlamp types, if they implement the interface.

According to an advantageous further development of the invention, it may be planned, that before step a), the light pattern information is determined and/or created by the interface device and/or a central control device of the vehicle, in particular centrally for several headlamps, in particular non-headlamp-specific, and/or transmitted to the processing device, preferably by means of at least one operation-dependent additional information, preferably from an adaptive light assistant. The adaptive light assistant can for example be embodied as an adaptive high beam assistant and/or as a dazzle-free high beam, and it allows for example an adaption of the light distribution of the headlamp and/or the generation of the light pattern information by means of camera information and/or automotive navigation system information of the vehicle. The additional information can for example comprise information from a camera system of the vehicle, and/or a navigation system of the vehicle, and/or a control information of the vehicle, and/or a status information of the vehicle. The control information can for example comprise an operation information, as for example a steering direction of the vehicle. The status information is for example information on the set headlamp mode, such as, for example, high beam or low beam. This can allow the headlamp to be controlled in an adaptive manner and to increase safety during the operation of the vehicle.

Furthermore, it can be planned, that in particular in section b) and/or section c) a calculation of at least one transfer information by means of a first headlamp-specific information and/or a first light pattern information and one second, subsequent in time (to the first information i.e. light pattern information) headlamp-specific information and/or second light pattern information is executed. Herein the transfer information corresponds in particular to a light distribution pattern of the headlamp, i.e. in particular to a control information of the headlamp which shall be set on the headlamp between the first light pattern information and a second light pattern information subsequent in time. Herein the calculation is preferably executed by means of an extrapolation and/or an interpolation and/or a prediction to allow upsampling, i.e. a crossover ramp.

Another subject matter of the invention is a device, in particular a headlamp, for a vehicle, which comprises at least one processing device for the processing of at least one non-headlamp-specific light pattern information as well as at least one pixel for light radiation. Herein, it is planned, that by means of the processing device, the light pattern information can be received by a (central) interface device and/or a central control device of the vehicle and subsequently be transformed into one headlamp-specific information by means of at least one headlamp-specific parameter, the pixel being controllable depending on the headlamp-specific information. Therewith, the device according to the invention has the same advantages, that are described in detail with regard to the procedure according to the invention. In addition, the device according to the invention can be operated according to a procedure according to the invention.

Optimally, it can be possible, that the device is embodied as a high-resolution headlamp, in particular as an adaptive LED headlamp. Alternatively or additionally, it is conceivable that the device, in particular the processing device, is connected via a bus system of the vehicle with the interface device and/or the central control device. The bus system is for example a LAN (local area network) or an Ethernet or a CAN-bus system. Herein, it can be planned, that the light pattern information is sent to the processing device from the interface device and/or the central control unit via the bus system before being received by the processing device. This ensures the safe and reliable control of the headlamp.

Another subject matter of the invention is an interface device for a vehicle, wherein the interface device is designed to generate a non-headlamp-specific light pattern information and/or provide it for a transmission, in particular to one or two device(s) according to the invention, in particular according to a procedure according to the invention. Herein, the interface device according to the invention entails the same advantages that are described in detail with regard to a device according to the invention and/or a procedure according to the invention.

A vehicle and a system are also protected, each having one or two devices according to the invention and/or an interface device and/or a central control device of the vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
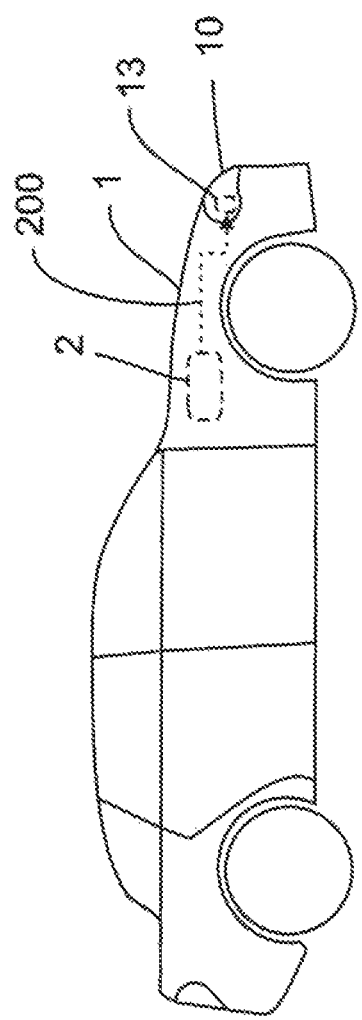
FIG. 1 is a schematic representation of a device according to the invention.

FIG. 1 shows a schematic representation of a vehicle 1 comprising a device 10 according to the invention, and in particular a headlamp 10. Furthermore, the vehicle 1 comprises another headlamp 10, which is not represented, on an opposite side. In the vehicle 1, a central control device 2 is provided, which is electrically connected via an interface device 200 (represented by a dashed line) and for example via a bus system, to the device 10 according to the invention, in particular with a processing device 13.

Figure 2:
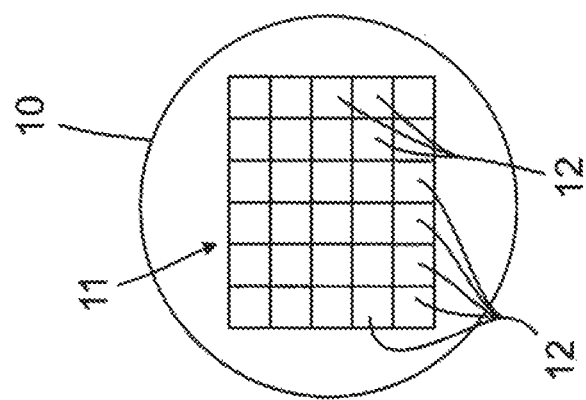
FIG. 2 is a schematic representation of a device according to the invention.

Furthermore the device 10 according to the invention comprises a pixel arrangement 11, as shown in FIG. 2. The pixel arrangement 11 comprises several pixels 12, which are for example arranged as a matrix and/or as an array. Individual pixels 12 can be controlled for example with regard to their brightness by the processing device 13.

Figure 3:
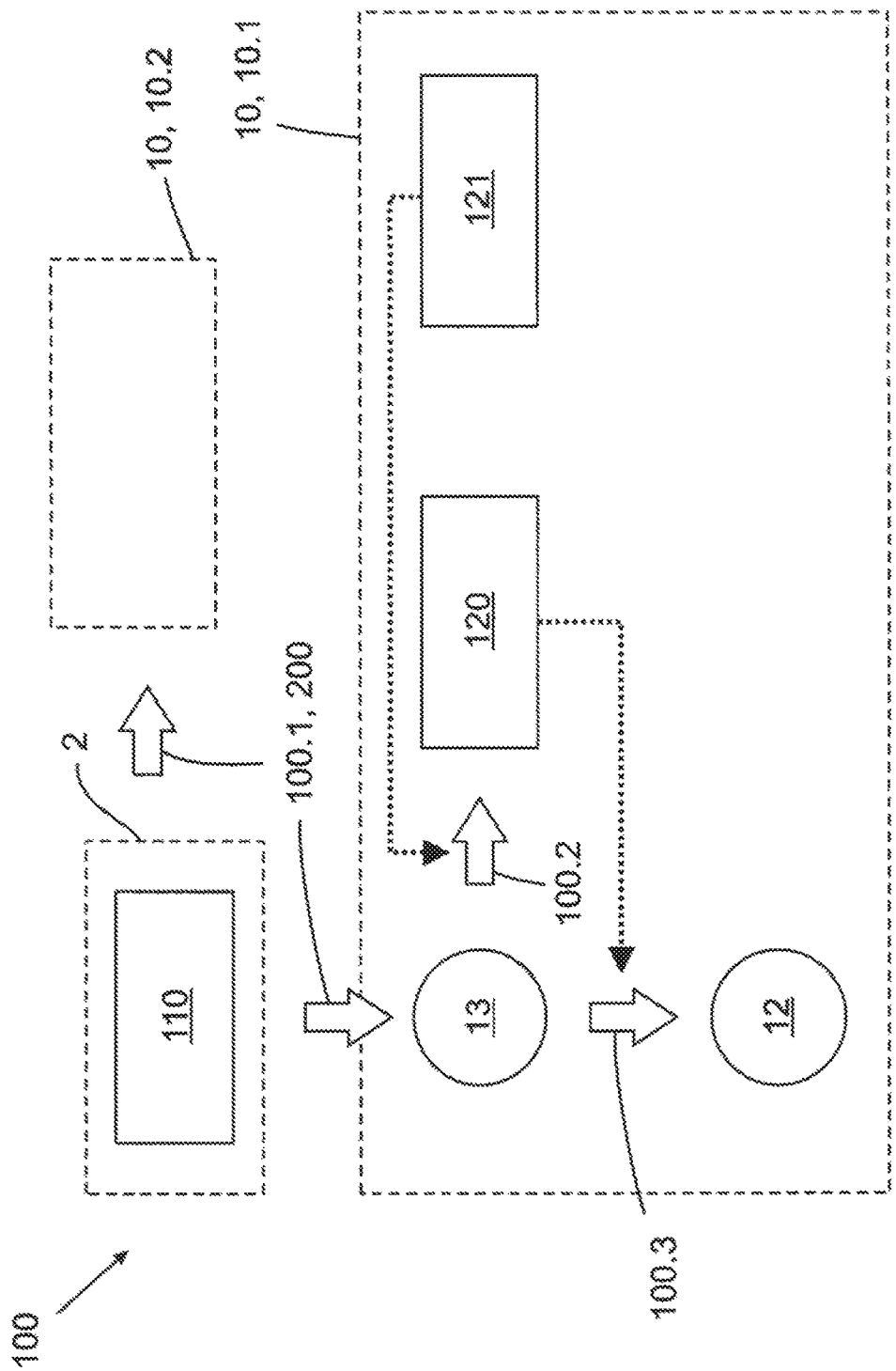
FIG. 3 is a schematic representation for the visualization of a procedure according to the invention.

FIG. 3 represents a procedure 100 in a schematic manner. Herein, it shows that a non-headlamp-specific light pattern information 110 is determined and/or calculated in the interface device 200 and/or in the central control device 2. Subsequently the light pattern information 110 is transmitted to a processing device 13 of one or two device(s) 10 according to the invention. According to a first process step 100.1, the light pattern information 110 is received by the processing device 13 and according to a second process step 100.2 it is transformed into a headlamp-specific information 120. Herein, a headlamp-specific parameter 121 is included, which was for example stored in the device 10 according to the invention. The headlamp-specific parameter 121 can, for example, also be embodied as a computer program, for example in the processing device 13. Herein, the processing device 13 is for example executed as a micro-processor and/or a micro-controller and/or a digital signal processor. According to a third process step 100.3, at least one pixel 12 is controlled, in particular by the processing device 13.

Furthermore, it can be seen in FIG. 3 that a first headlamp 10.1, i.e. a first device 10.1 according to the invention, as well as a second headlamp 10.2, i.e. a second device 10.2 according to the invention of the vehicle 1, can be controlled in an identical manner by the interface device 200 and/or the central control device 2 of the vehicle 1. Like the first device 10.1 according to the invention, i.e. the device 10 according to the invention, the second device 10.2 according to the invention a processing device 13 and can be operated according to a procedure 100 according has to the invention.

The above explanation of the embodiments describes the present invention exclusively in examples. The individual characteristics of the embodiments can, of course, be freely combined as far as this is technically sensible, without leaving the framework of the present invention.

LIST OF REFERENCE SIGNS

1 Vehicle
2 Control device

10 Device, headlamp
10.1 First device
10.2 Second device
11 Pixel arrangement
12 Pixel
13 Processing device
100 Procedure
100.1 First process step
100.2 Second process step
100.3 Third process step
110 Light pattern information
120 Headlamp-specific information
121 Headlamp-specific parameters
200 Interface device

The invention claimed is:

1. A method for the operation of at least one headlamp of a vehicle and for the headlamp-specific adaptation of at least one non-headlamp-specific light pattern information by an interface device of the vehicle, comprising the following steps:
   a) receiving the non-headlamp-specific light pattern information by a processing device of the headlamp from a central control unit located in the vehicle and separate from the headlamp,
   b) transforming the light pattern information into headlamp-specific information by means of the processing device using at least one headlamp-specific parameter, and
   c) controlling at least one pixel of the headlamp depending on the headlamp-specific information.

2. The method according to claim 1, wherein the headlamp has a pixel arrangement with several pixels,
   wherein the pixels are each controlled individually by the processing device by means of at least one control information to at least one of determine and vary a light distribution of the headlamp.

3. The method according to claim 2, wherein the headlamp-specific information comprises the control information for each individual pixel of the pixel arrangement.

4. The method according to claim 1 wherein the headlamp-specific parameter comprises at least one of the information below:
   optical properties of the headlamp
   number and/or arrangement of the pixels of the headlamp,
   brightness levels of the individual pixels,
   properties of at least one reflector of the headlamp,
   properties of at least one light source of the headlamp,
   information on a transmission function of the headlamp,
   properties of further optical components of the headlamp.

5. The method according to claim 1 wherein at least one of the transformation according to step b) and the control according to step c) is executed by at least one of a headlamp-specific algorithm executed by the processing device, a model-based calculation, and a simulation of the light radiation of the headlamp, in a manner that the headlamp-specific information comprises a control information being required for the creation of an optical light distribution pattern according the light pattern information.

6. The method according to claim 1 wherein in at least one of step b) and step c), a calculation of at least one transfer information by means of at least one of a first headlamp-specific information and one first light pattern information and at least one of a second, subsequent (in time) headlamp-specific information and second light pattern information is executed.

7. A device for a vehicle, the device comprising:
   at least one processing device for the processing of at least one non-headlamp-specific light pattern information,
   at least one pixel for light radiation,
   wherein by means of the processing device, the light pattern information is received by one of a control device of the vehicle and an interface device of the vehicle separate from a headlamp and subsequently transformed into at least one headlamp-specific information by means of at least one headlamp-specific parameter, the pixel being controllable depending on the headlamp-specific information.

8. The device according to claim 7, wherein the device is embodied as a high-resolution adaptive LED headlamp.

* * * * *